(12) United States Patent
Araki et al.

(10) Patent No.: US 8,785,066 B2
(45) Date of Patent: Jul. 22, 2014

(54) FUEL CELL SYSTEM AND CONTROL METHOD THEREFOR

(75) Inventors: Yasushi Araki, Gotemba (JP); Sho Usami, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 165 days.

(21) Appl. No.: 13/280,119

(22) Filed: Oct. 24, 2011

(65) Prior Publication Data

US 2012/0100449 A1 Apr. 26, 2012

(30) Foreign Application Priority Data

Oct. 25, 2010 (JP) ................................. 2010-238177

(51) Int. Cl.
*H01M 8/04* (2006.01)

(52) U.S. Cl.
USPC ............................. 429/429; 429/433; 429/437

(58) Field of Classification Search
USPC .................................. 429/429, 443, 433, 437
See application file for complete search history.

(56) References Cited

U.S. PATENT DOCUMENTS

2008/0026274 A1* 1/2008 Zhang et al. .................... 429/26

FOREIGN PATENT DOCUMENTS

| JP | 03-210772 A | 9/1991 |
|---|---|---|
| JP | 2002-319425 A | 10/2002 |
| JP | 2003-036874 A | 2/2003 |
| JP | 2004-063118 A | 2/2004 |
| JP | 2007-087779 A | 4/2005 |
| JP | 2005-129448 A | 5/2005 |
| JP | 2005-339872 A | 12/2005 |
| JP | 2006-286573 A | 10/2006 |
| JP | 2007-128698 A | 5/2007 |
| JP | 2009245802 A | 10/2009 |
| JP | 2010123493 A | 6/2010 |

* cited by examiner

*Primary Examiner* — Ula C Ruddock
*Assistant Examiner* — Frank Chernow
(74) *Attorney, Agent, or Firm* — Gifford, Krass, Sprinkle, Anderson & Citkowski, P.C.

(57) ABSTRACT

A fuel cell system includes: a fuel cell activation portion that starts electricity generation of a fuel cell; a cooling medium passage that is provided with a pump and that is provided for passing a cooling medium through a cell-side passage for the cooling medium; and a pump control portion that stops the pump for a first predetermined period after a start of the electricity generation caused by the fuel cell activation portion at a time when a temperature of the fuel cell is a low temperature lower than or equal to a predetermined value, and that starts operating the pump after the first predetermined period elapses. The pump control portion includes a cooling medium reverse portion that alternately reverses a direction of flow of the cooling medium in the cell-side passage according to elapsed time by controlling operation of the pump after the first predetermined period elapses.

4 Claims, 8 Drawing Sheets

FUEL CELL SYSTEM AND CONTROL METHOD THEREFOR

INCORPORATION BY REFERENCE

This application claims priority to Japanese Patent Application No. 2010-238177 filed on Oct. 25, 2010, which is incorporated herein by reference in its entirety including the specification, drawings and abstract.

BACKGROUND OF THE INVENTION

1. Field of the Invention

The invention relates to a fuel cell system that includes a fuel cell, and to a control method for the fuel cell system.

2. Description of Related Art

There is known a fuel cell system that activates a fuel cell after stopping the circulation of a cooling medium in the case where the system is activated below the freezing point (see Japanese Patent Application Publication No. 2003-36874 (JP-A-2003-36874)). This configuration prevents an event in which, at the time of such activation, the very cold cooling medium is sent into an interior of the fuel cell and therefore the internal temperature of the fuel cell becomes excessively low. In this configuration, when the internal temperature of the fuel cell subsequently rises up, the circulation of the cooling medium is started.

However, in the foregoing related art, as the circulation of the cooling medium starts, the temperature near a cooling medium inlet of the fuel cell and the ambient temperature around the cooling medium inlet temporarily drops, so that the product water remaining from before the system is activated (hereinafter, referred to as "remaining water") sometimes re-freezes. If the remaining water re-freezes, a catalyst layer in the fuel cell may be damaged.

SUMMARY OF THE INVENTION

The invention prevents the damage to the catalyst layer in a fuel cell caused by the re-freezing of the remaining water after the fuel cell is activated.

A first aspect of the invention relates to a fuel cell system. The fuel cell system includes: a fuel cell; a cell-side passage for a cooling medium, which is provided on a side of the fuel cell; a fuel cell activation portion that starts electricity generation of the fuel cell; a cooling medium passage that is provided with a pump and that is provided for passing the cooling medium through the cell-side passage; and a pump control portion that stops the pump for a first predetermined period after a start of the electricity generation caused by the fuel cell activation portion at a time when a temperature of the fuel cell is a low temperature lower than or equal to a first predetermined value, and that starts operating the pump after the first predetermined period elapses. The pump control portion includes a cooling medium reverse portion that alternately reverses a direction of flow of the cooling medium in the cell-side passage according to elapsed time by controlling operation of the pump after the first predetermined period elapses.

In the fuel cell system of the first aspect of the invention, after the first predetermined period elapses following the time at which the fuel cell is activated at a low temperature, the operation of the pump is started so that the cooling medium is passed through the cell-side passage for the cooling medium, which is provided on the side of the fuel cell. At this time, the cooling medium reverse portion alternately reverses the direction of flow of the cooling medium according to the elapsed time, so that the temperature in the cell-side passage becomes uniform in a direction along the surface of the fuel cell. Therefore, the temperature drop can be reduced at the vicinity of the inlet for the cooling medium and its surroundings, at which the temperature is most likely to drop due to the inflow of the cooling medium. Therefore, the remaining water present within the fuel cell system from prior to the activation of the fuel cell will not re-freeze. Therefore, in the fuel cell system of the first aspect, it is possible to prevent the degradation of the catalyst layer within the fuel cell caused by the re-freeze of the remaining water.

In the fuel cell system of the foregoing aspect, the cooling medium reverse portion may switch a rotation direction of the pump as a control of the operation of the pump.

In the foregoing fuel cell system, the direction of flow of the cooling medium in the cell-side passage is reversed by switching the rotation direction of the pump. Therefore, the direction of flow of the cooling medium is switched by a simple control of switching the rotation direction of the pump.

In the fuel cell system of the foregoing aspect, the cell-side passage may include two portions that are disposed along a surface of the fuel cell, and the cooling medium passage may include a first passage and a second passage that are provided for passing the cooling medium through the two portions, respectively, and each of the first passage and the second passage may be provided with the pump, and the cooling medium reverse portion may, by controlling the operation of the pump, alternately switch between a first state in which the cooling medium reverse portion stops the flow of the cooling medium in the first passage and causes the cooling medium in the second passage to flow in a first direction along the surface of the fuel cell and a second state in which the cooling medium reverse portion causes the cooling medium in the first passage to flow in a second direction that opposes the first direction and stops the flow of the cooling medium in the second passage, according to the elapsed time.

In the foregoing fuel cell system, the direction of flow of the cooling medium in the cell-side passage is alternately reversed according to the elapsed time.

In the fuel cell system of the foregoing aspect, the cooling medium reverse portion may alternately reverse the direction of flow of the cooling medium in the cell-side passage according to the elapsed time during a second predetermined period, and the pump control portion, after the second predetermined period elapses, may continue operating the pump while setting the direction of flow of the cooling medium in the cell-side passage to one direction by controlling the operation of the pump.

In the foregoing fuel cell system, after the control of reversing the flow of the cooling medium according to the elapsed time is performed by the cooling medium reverse portion, the operation of the pump is switched to an operation in which the direction of flow of the cooling medium is set to one direction. Therefore, the fuel cell is appropriately controlled even after the fuel cell is activated at a low temperature.

In the fuel cell system of the foregoing aspect, the first predetermined period may be a period that elapses until an internal temperature of the fuel cell exceeds a second predetermined value.

In the foregoing fuel cell system, the supply of the cooling medium to the fuel cell is started when the internal temperature of the fuel cell exceeds the second predetermined value.

A second aspect of the invention relates to a fuel cell system. The fuel cell system includes: a fuel cell; a cell-side passage for a cooling medium, which is provided on a side of the fuel cell; a fuel cell activation portion that starts electricity generation of the fuel cell; a cooling medium passage that is provided with a pump and that is provided for passing the cooling medium through the cell-side passage; and a pump control portion that starts operation of the pump when the electricity generation is started by the fuel cell activation portion. The pump control portion determines whether or not an accumulated absorbed heat quantity, which is an accumulated quantity of heat absorbed by the cooling medium after the cooling medium starts flowing to the cooling medium passage at a time when a temperature of the fuel cell is a low temperature lower than or equal to a first predetermined value, is greater than a criterion heat quantity that is based on an accumulated generated heat quantity that is an accumulated quantity of heat generated by the fuel cell after the cooling medium starts flowing to the cooling medium passage, and the pump control portion stops the operation of the pump when the pump control portion determines that the accumulated absorbed heat quantity is greater than the criterion heat quantity.

In the fuel cell system of the second aspect, in the case where the quantity of heat absorbed by the cooling medium is large, the operation of the pump is stopped, so that the quantity of heat absorbed by the cooling medium is reduced. Therefore, it is possible to suppress the re-freeze of the remaining water. Hence, in the case where the fuel cell has been activated at a low temperature, it is possible to prevent the degradation of the catalyst layer caused by the re-freeze of the remaining water.

A third aspect of the invention relates to a control method for a fuel cell system that includes a fuel cell, a cell-side passage for a cooling medium, which is provided on a side of the fuel cell, and a cooling medium passage that is provided with a pump and that is provided for passing the cooling medium through the cell-side passage. The control method includes: starting electricity generation of the fuel cell based on a start request from an operator; stopping the pump for a predetermined period after a start of the electricity generation at a time when a temperature of the fuel cell is a low temperature lower than or equal to a predetermined value; and alternately reversing a direction of flow of the cooling medium in the cell-side passage according to elapsed time by controlling operation of the pump, when the operation of the pump is started after the predetermined period elapses.

A fourth aspect of the invention relates to a control method for a fuel cell system that includes a fuel cell, a cell-side passage for a cooling medium, which is provided on a side of the fuel cell, and a cooling medium passage that is provided with a pump and that is provided for passing the cooling medium through the cell-side passage. The control method includes: starting electricity generation of the fuel cell based on a start request from an operator; determining whether or not an accumulated absorbed heat quantity, which is an accumulated quantity of heat absorbed by the cooling medium after the cooling medium starts flowing to the cooling medium passage at a time when a temperature of the fuel cell is a low temperature lower than or equal to a predetermined value, is greater than a criterion heat quantity that is based on an accumulated generated heat quantity that is an accumulated quantity of heat generated by the fuel cell after the cooling medium starts flowing to the cooling medium passage; and stopping operation of the pump when it is determined that the accumulated absorbed heat quantity is greater than the criterion heat quantity.

According to the fuel cell system control methods according to the third and fourth aspects, it is possible to prevent the degradation of the catalyst layer in the fuel cell caused by the re-freeze of the remaining water, as in the fuel cell systems of the first and second aspects.

Furthermore, the invention may also be realized in various manners other than the foregoing aspects. For example, the individual processes of the fuel cell system control method according to either one of the third and fourth aspects may be realized in the form of programs that are to be executed by a computer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Next, embodiments of the invention will be described.

A. First Embodiment

A1. Hardware Configuration

Figure 1:
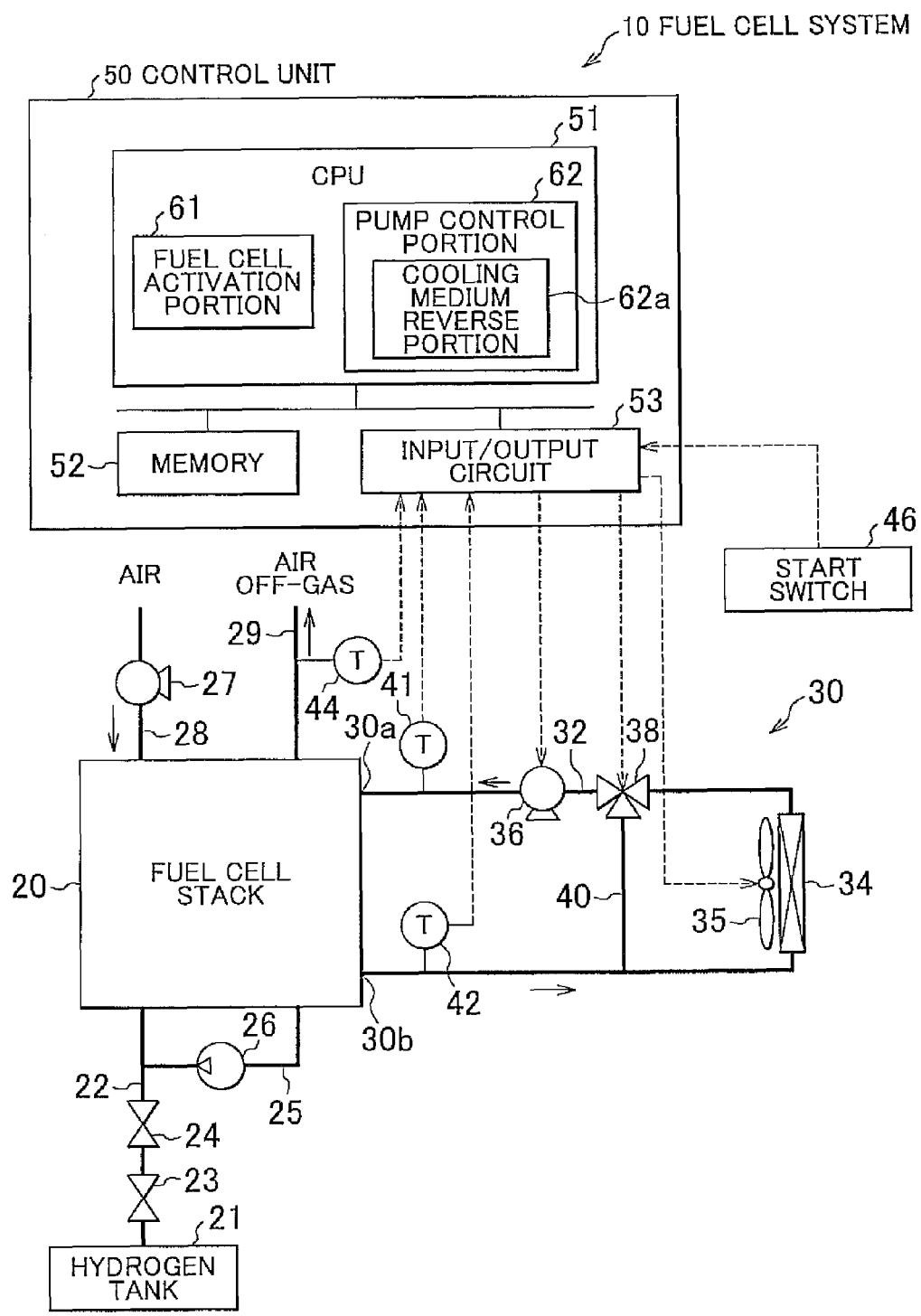
FIG. 1 is an illustrative diagram showing a configuration of a fuel cell system of a first embodiment of the invention.

FIG. 1 is an illustrative diagram showing a configuration of a fuel cell system 10 as a first embodiment of the invention. This fuel cell system 10 is mounted and used in an electric vehicle that uses as drive electric power the electric power that is produced by a fuel cell. The fuel cell system 10 includes a fuel cell stack 20, a cooling system 30, a control unit 50, etc.

The fuel cell stack 20 is a solid polymer electrolyte fuel cell stack having a stack structure in which a plurality of unit cells are stacked and connected in series. The unit cells are well-known cells which are each configured by sandwiching a membrane-electrode assembly (MEA) between gas diffusion layers, and further sandwiching the MEA and the gas diffusion layers between separators.

Each of the unit cells of the fuel cell stack 20 is supplied with a fuel gas and an oxidant gas that are used in the cell reaction. An anode electrode (hydrogen electrode) of each unit cell is supplied with hydrogen as a fuel gas, via a pipe 22, from a hydrogen tank 21 that stores high-pressure hydrogen. Instead of providing the hydrogen tank 21, hydrogen may be produced by a reforming reaction that uses alcohol, hydrocarbon or the like as a raw material. The pipe 22 is provided with a shut valve 23 and a pressure regulating valve 24, in order to adjust the supply of hydrogen. The hydrogen discharged from the anode electrode of each unit cell is returned to the pipe 22 via a pipe 25, and is circulated through the fuel cell stack 20 again. A hydrogen pump 26 for circulation is disposed on the pipe 25.

The cathode electrode (oxygen electrode) of each unit cell is supplied with air as an oxidant gas from an air pump 27 via a pipe 28. The air discharged from the cathode electrode of each unit cell is released into the atmosphere via a pipe 29.

In addition to the fuel gas and the oxidant gas, a cooling medium is supplied to the fuel cell stack 20, so that each unit cell, whose temperature rises as electricity is generated, is cooled by the cooling medium. In this embodiment, an anti-freezing solution obtained by adding ethylene glycol or the like to water is used as the cooling medium. However, instead of the anti-freezing solution, it is also possible to use a given cooling liquid such as pure water. Besides, instead of a cooling liquid, a gas, such as carbon dioxide, may also be used as the cooling medium.

The cooling system 30 includes a circulation circuit 32 that circulates the cooling medium. The fuel cell stack 20 and the radiator 34 are disposed within the circulation circuit 32. An electric fan 35 is disposed near the radiator 34. The radiator 34 cools the cooling medium sent from the fuel cell stack 20 via the circulation circuit 32, by using wind from the electric fan 35, and releases heat from the cooling medium to the outside of the vehicle.

A water pump 36 is provided in the circulation circuit 32. Due to the discharging force of the water pump 36, the cooling medium circulates in the circulation circuit 32. The water pump 36 is configured so as to be able to switch between the forward rotation and the reverse rotation in terms of rotation direction. When in the forward rotation, the water pump 36 circulates the cooling medium in a counterclockwise direction as shown in FIG. 1 (i.e., the direction of arrows). When in the reverse rotation, the water pump 36 circulates the cooling medium in a clockwise direction (not shown). Hereinafter, the counterclockwise flow of the cooling medium during the forward rotation will be referred to as "forward flow", and the clockwise flow thereof during the reverse rotation will be referred to as "reverse flow".

A three-way valve 38 is provided on the circulation circuit 32 at a position between the radiator 34 and the water pump 36. One of the ports of the three-way valve 38 is connected to a bypass passage 40 that bypasses the radiator 34. The bypass passage 40 is provided in parallel with the radiator 34. When the three-way valve 38 is switched to a first state in which the radiator 34 and the water pump 36 communicate with each other and the bypass passage 40-side is closed, the cooling medium cooled by the radiator 34 circulates between the radiator 34 and the fuel cell stack 20. When the three-way valve 38 is switched to a second state in which the water pump 36 and the bypass passage 40 communicate with each other and the radiator 34-side is closed, the cooling medium circulates through the fuel cell stack 20 without passing through the radiator 34. By switching the three-way valve 38 to the second state, the cooling medium that flows into the fuel cell stack 20 is prevented from being cooled by the radiator 34.

The control unit 50 mainly includes a Central Processing Unit (CPU) 51, a memory 52, and an input/output circuit 53. The input/output circuit 53 is connected to various actuators, various sensors, various switches, etc., via control signal lines (not shown). The various actuators include the shut valve 23, the pressure regulating valve 24, the hydrogen pump 26, the air pump 27, the water pump 36, the three-way valve 38, and the electric fan 35.

The various sensors include a first temperature sensor 41 that is provided near a supply opening 30a of the circulation circuit 32 to the fuel cell stack 20 (i.e., an opening that serves as supply opening during the forward rotation of the water pump 36) and that detects the temperature of the cooling medium, a second temperature sensor 42 that is provided near a reception opening 30b of the circulation circuit 32 from the fuel cell stack 20 (i.e., an opening that serves as a reception opening during the forward operation of the water pump 36) and that detects the temperature of the cooling medium, and a third temperature sensor 44 that is provided in the pipe 29 and that detects the temperature of an air off-gas from the fuel cell stack 20. One of the various switches is a start switch 46 for starting the electric vehicle in which the fuel cell system 10 is mounted.

The third temperature sensor 44 is provided for detecting the internal temperature of the fuel cell system 10 (i.e., the internal temperature of the fuel cell stack 20). As the third temperature sensor 44, a temperature sensor provided in the pipe 29 is employed in this configuration, on the assumption that the temperature of the air off-gas reflects the internal temperature of the fuel cell system 10 (i.e., the internal temperature of the fuel cell stack 20). The third temperature sensor may have any configuration as long as the sensor is able to detect the internal temperature of the fuel cell system 10 (i.e., the internal temperature of the fuel cell stack 20). For example, the third temperature sensor may be a sensor that is provided directly within the fuel cell stack.

The memory 52 mainly stores computer programs (not shown) for controlling the fuel cell system 10. The CPU 51 functions as a fuel cell activation portion 61 and a pump control portion 62 by executing such computer programs (e.g., a computer program of an activation-time control routine (described below)). The pump control portion 62 includes a cooling medium reverse portion 62a.

Figure 2:
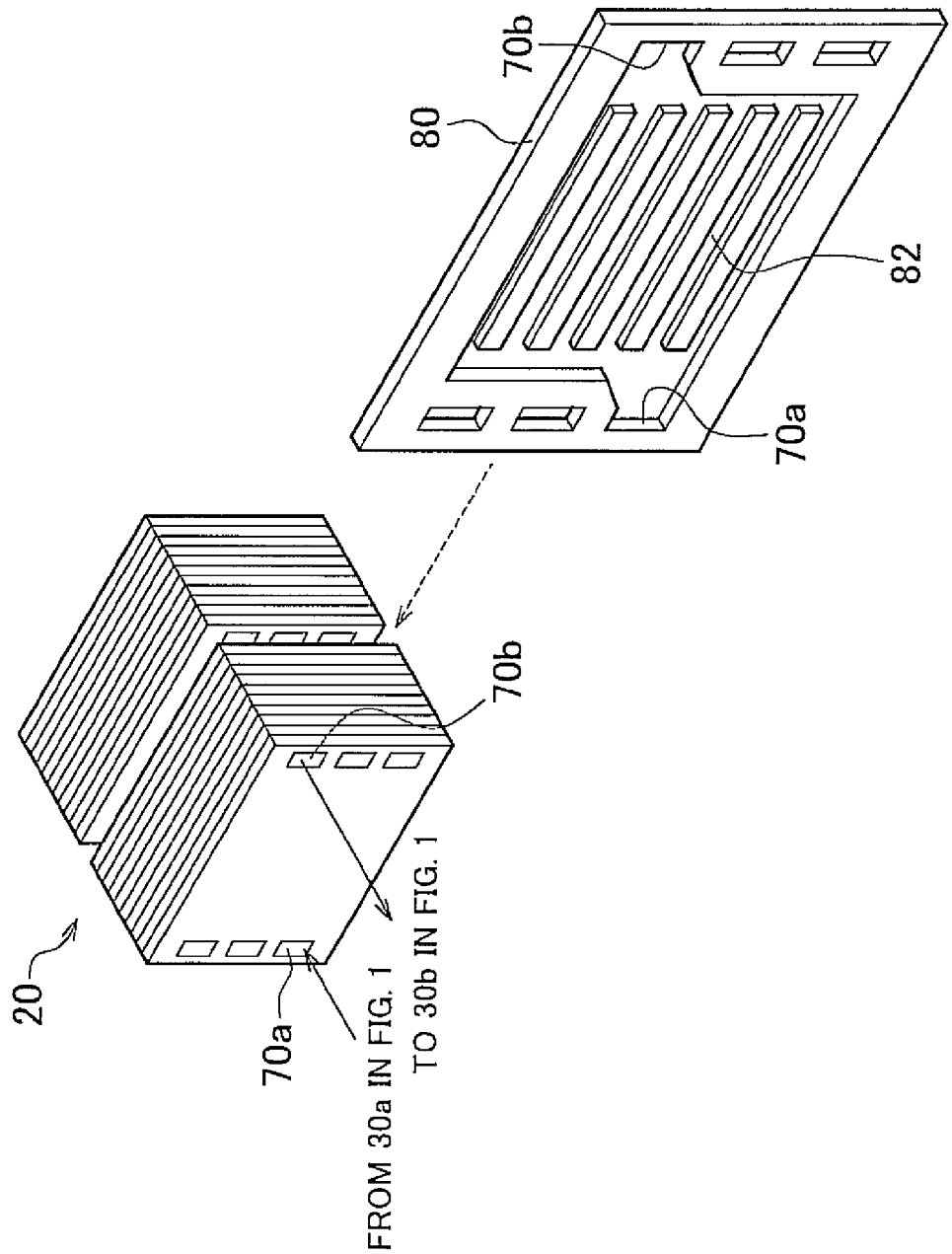
FIG. 2 is a perspective view for illustrating one of cooling medium plates that are included in a fuel cell stack.

FIG. 2 is a perspective view for illustrating one of cooling medium plates 80 that are included in the fuel cell stack 20. The fuel cell stack 20, having a stack structure in which a plurality of unit cells are stacked and connected in series as described above, has three pairs of holes that extend through the plurality of unit cells. Of the three pairs of holes, one pair of holes 70a and 70b are provided for the cooling medium. The hole 70a forms an upstream-side passage for the cooling medium, and the hole 70b forms a downstream-side passage for the cooling medium. The other pairs of holes are provided for the hydrogen gas and air, and will not be described in detail in this specification.

The cooling medium plates 80 are each disposed between adjacent unit cells in a juxtaposed arrangement. The hole 70a that forms the upstream-side cooling medium passage is connected to one end of each of inter-cell cooling medium passages 82 that are formed on the cooling medium plates 80, and therefore functions as a supply manifold for the cooling medium, which distributes the cooling medium sent from the supply opening 30a (FIG. 1) of the circulation circuit 32 to the inter-cell cooling medium passages 82 that are provided between the unit cells. The hole 70b that forms the downstream-side passage is connected to another end of each inter-cell cooling medium passage 82 (i.e., an end portion opposite to the end portion to which the hole 70a is connected), and therefore functions as a fluid discharge manifold, which gathers the cooling medium discharged from the inter-cell cooling medium passages 82 and leads it to the reception opening 30b (FIG. 1) of the circulation circuit 32.

It is to be noted herein that the inter-cell cooling medium passage 82 of each cooling medium plate 80 is made up of a plurality of groove passages. The groove passages are formed in a central region of a surface of the cooling medium plate 80, which faces an electricity generation region of the adjacent unit cell (i.e., faces the electricity generation region in the unit cell stacking direction in which the unit cells are stacked), and the groove passages extend along a side surface of the adjacent unit cell (i.e., a surface thereof perpendicular to the unit cell stacking direction). The inter-cell cooling medium passage 82 may be regarded as a "cell-side passage" according to the invention. One unit cell may be regarded as a "fuel cell" according to the invention.

Although in this embodiment, one cooling medium plate 80 is provided on a side of one unit cell, this configuration may be replaced by a configuration in which one cooling medium plate 80 is provided for a plurality of unit cells.

A2. Software Configuration

A2-1. Activation-Time Control Routine

Figure 3:
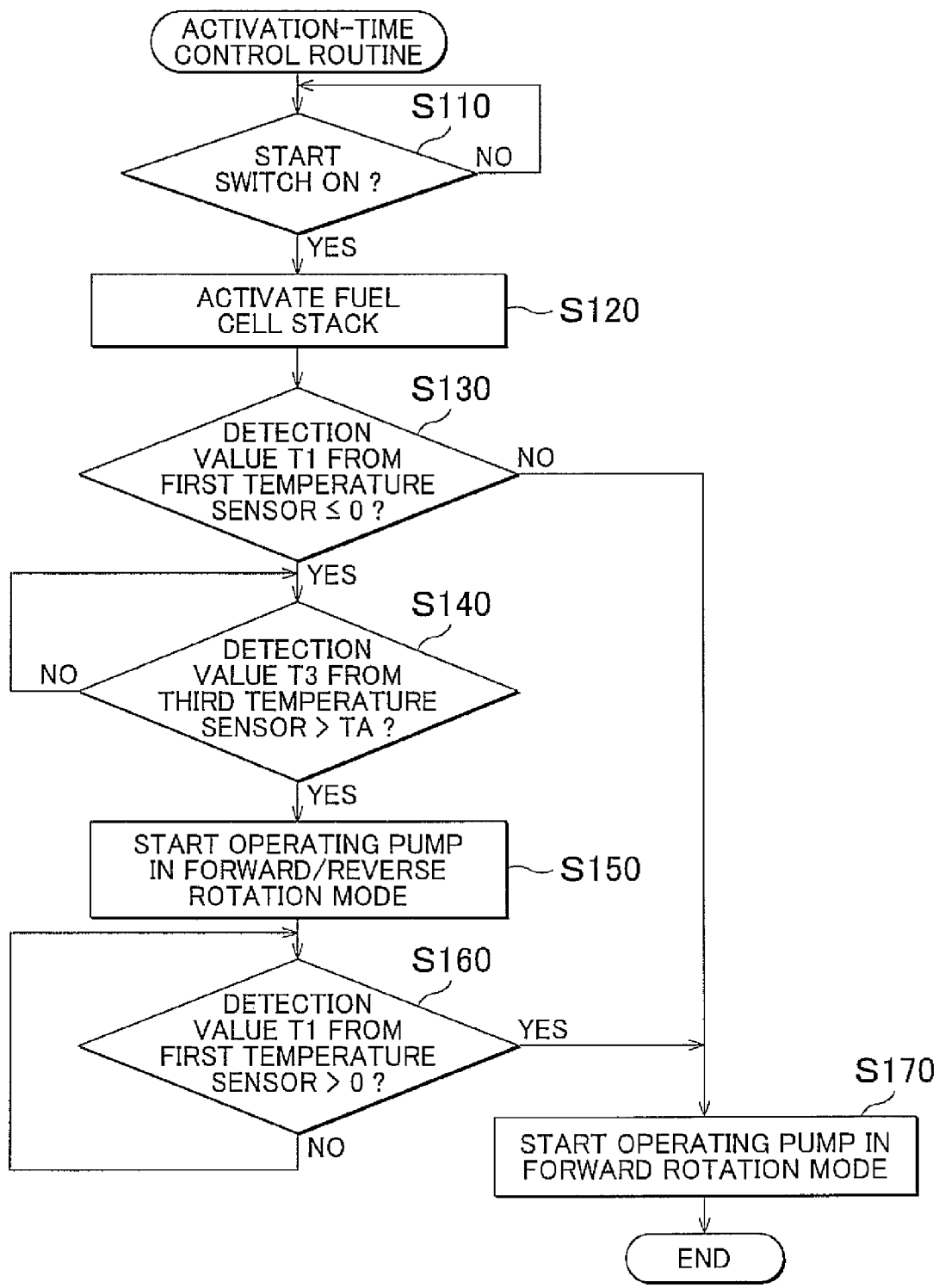
FIG. 3 is a flowchart showing an activation-time control routine.

An activation-time control routine that is executed by the CPU 51 of the control unit 50 will be described. FIG. 3 is a flowchart showing an activation-time control routine. This activation-time control routine is executed by a dark electric current when the electric vehicle has not been started. As shown in FIG. 3, when the process starts, the CPU 51 firstly determines whether or not the start switch 46 is in an on-state (step S110). If it is determined that the start switch 46 is not in the on-state, that is, is in the off-state, the CPU 51 repeats the process of step S110 to wait until the start switch 46 is operated and brought to the on-state by an operator.

If in step S110, it is determined that the start switch 46 is in the on-state, the CPU 51 activates the fuel cell stack 20 (step S120). Specifically, the CPU 51 starts electricity generation of the fuel cell stack 20 (i.e., activates the fuel cell stack 20) by controlling the shut valve 23, the pressure regulating valve 24, the hydrogen pump 26 and the air pump 27 so that the hydrogen gas and air are supplied to the fuel cell stack 20.

Subsequently, the CPU 51 determines whether or not a detection value T1 from the first temperature sensor 41 is lower than or equal to 0° C. (step S130). This determination process is executed to determine whether or not the ambient temperature in the fuel cell system 10 is lower than or equal to the freezing point on the basis of the temperature of the cooling medium within the circulation circuit 32. If in this step, it is determined that the detection value T1 is lower than or equal to 0° C., the CPU 51 proceeds to step S140, in order to perform a series of processes provided for activation at low temperature.

The temperature value 0° C. used as a threshold value in step S130 is a criterion for determining whether or not the temperature of the fuel cells is in a low temperature range. However, this threshold does not need to be limited to 0° C., but may also be a temperature below 0° C., for example, −2° C., −4° C., etc. Besides, the sensor that outputs the detection value for the determination in step S130 does not need to be limited to the first temperature sensor 41, but the sensor may be any sensor as long as it is able to detect a parameter that reflects the ambient temperature in the fuel cell system 10, for example, a temperature sensor installed outside the fuel cell system 10.

In step S140, the CPU 51 determines whether or not a detection value T3 from the third temperature sensor 44 is higher than a predetermined temperature TA. The predetermined temperature TA is, for example, 40° C. That is, in step S140, it is determined whether or not the fuel cell stack 20 has been warmed up so that the temperature of the air off-gas is higher than 40° C. If in step S140 it is determined that the detection value T3 from the third temperature sensor 44 is lower than or equal to the predetermined temperature TA, the CPU 51 repeats the process of step S140 to wait for the detection value T3 from the third temperature sensor 44 to exceed the predetermined temperature TA.

The predetermined temperature TA does not need to be limited to 40° C., but may also be any other temperature as long as the temperature allows the determination that the fuel cell stack 20 has been warmed up. For example, the predetermined temperature TA may be 45° C., 50° C., etc. Besides, the sensor that outputs the detection value for the determination in step S140 does not need to be limited to the third temperature sensor 44, but the sensor may be any sensor as long as it is able to detect a parameter that reflects the internal temperature of the fuel cells. For example, the sensor may be a temperature sensor installed within the fuel cell stack 20.

If in step S140, it is determined that the detection value T3 from the third temperature sensor 44 is higher than the predetermined temperature TA, the CPU 51 starts to operate the water pump 36 in a forward/reverse rotation mode (step S150). The forward/reverse rotation mode is a mode in which the operation of the water pump 36 is switched between the forward rotation and the reverse rotation according to the elapsed time. This mode will be described later. At this time, the three-way valve 38 provided on the circulation circuit 32 is assumed to be open to the bypass passage 40. If the three-way valve 38 is not open to the bypass passage 40 at this time, the CPU 51 opens the three-way valve 38 to the bypass passage 40 by controlling the three-way valve 38. Specifically, in the forward/reverse rotation mode, the circulation of the cooling medium is started without cooling the cooling medium at the radiator 34.

After the activation in step S120, the temperature of the fuel cell stack 20 gradually rises. Therefore, it is determined, after execution of the process of step S150, whether or not the detection value T1 from the first temperature sensor 41, which is provided at the supply opening of the circulation circuit 32, i.e., the supply opening to the fuel cell stack 20, has exceeded 0° C. during the forward rotation of the water pump 36 (step S160). This determination is performed to determine whether or not the temperature of the circulation circuit 32 has sufficiently risen. The threshold value used in step S160 is not limited to 0° C., and may be another temperature, for example, 2° C., 4° C., etc. Note that the foregoing threshold value is preferably 0° C.

Although in step S160, the determination is carried out through the use of the detection value T1 from the first temperature sensor 41 provided near the supply opening 30a to the fuel cell stack 20 at the time of forward flow of the cooling medium, the use of the detection value T1 may be replaced by the use of a detection value T2 from the second temperature sensor 42 provided near the reception opening 30b from the fuel cell stack 20 at the time of forward flow of the cooling medium. However, in the case where this configuration is employed, the threshold value needs to be changed from 0° C. to, for example, 80° C. Besides, it is also possible to employ a configuration in which it is determined whether or not the detection value T1 from the first temperature sensor 41 at the time of forward flow of the cooling medium is higher than 80° C.

If in step S160, the detection value T1 from the first temperature sensor 41 during the forward rotation of the water pump 36 is lower than or equal to 0° C., the CPU 51 repeats the process of step S160 to wait for the detection value T1 to exceed 0° C. If in step S160 it is determined that the detection value T1 from the first temperature sensor 41 during the forward rotation of the water pump 36 has exceeded 0° C., the CPU 51 starts to operate the water pump 36 in the forward rotation mode (step S170). After that, this activation-time control routine is ended.

On the other hand, if in step S130 it is determined that the detection value T1 from the first temperature sensor 41 is higher than 0° C., that is, if in step S130 it is determined that the temperature of the cooling medium in the circulation circuit 32 at the time of activation of the fuel cell stack 20 is higher than the 0° C., the CPU 51 proceeds to step S170, in which the CPU 51 starts to operate the water pump 36 in the forward rotation mode.

After the activation-time control routine configured as described above is ended, the operation of the fuel cell stack 20 continues, and the operation of the water pump 36 continues in the forward rotation mode, which is started in step S170. The processes of steps S110 and S120 correspond to the fuel cell activation portion 61 as a function that the CPU 51 executes. The processes from steps S130 to S170 correspond to the pump control portion 62 as a function that the CPU 51 executes. The process of step S150 corresponds to the cooling medium reverse portion 62*a*.

A2-2. Forward/Reverse Rotation Mode of Water Pump

The forward/reverse rotation mode of the water pump 36 is an operation mode in which the rotation direction of the water pump 36 is switched between the forward rotation and the reverse rotation at intervals of a predetermined period. By switching the rotation direction of the water pump 36 between the forward rotation and the reverse rotation, the direction of flow of the cooling medium in the inter-cell cooling medium passage 82 within the fuel cell stack 20 is reversed.

FIGS. 4A to 4D are illustrative diagrams showing changes of the direction of flow of the cooling medium in the inter-cell cooling medium passage 82 during the forward/reverse rotation mode. At intervals of the predetermined period, the state of the flow of the cooling medium changes from the state shown in FIG. 4A to the state shown in FIG. 4B, and then changes to the state shown in FIG. 4C, and, after that, changes to the state shown in FIG. 4D. FIGS. 4A to 4D are plan views of the cooling medium plate 80. In the inter-cell cooling medium passage 82 formed on the cooling medium plate 80, the cooling medium flows along the surface of the adjacent one of the unit cells in the fuel cell stack 20.

Figure 4A:
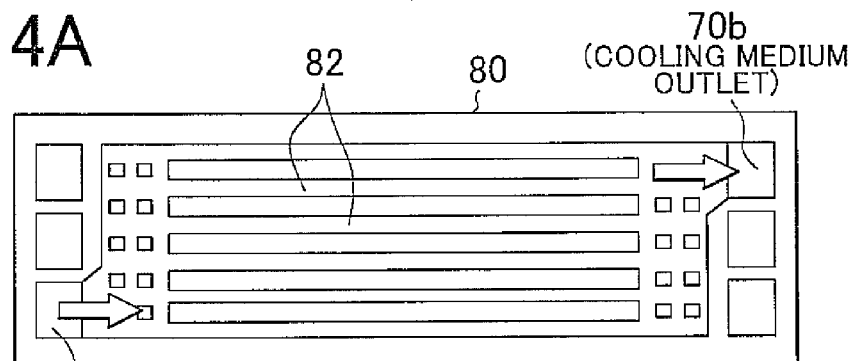
FIGS. 4A to 4D are illustrative diagrams showing changes of the flowing direction of the cooling medium in an inter-cell cooling medium passage in a forward/reverse rotation mode.

When the water pump 36 is operated in the forward rotation direction, the cooling medium flows in the circulation circuit 32 as the forward flow shown in FIG. 1. At this time, in each cooling medium plate 80, the hole 70*a* functions as an inlet for the cooling medium (hereinafter, referred to as "cooling medium inlet") as shown in FIG. 4A, and the cooling medium flowing in via the hole 70*a* moves through the inter-cell cooling medium passage 82 from a lower left portion toward an upper right portion in the drawing. At this time, the hole 70*b*, which pairs with the hole 70*a*, functions as an outlet for the cooling medium (hereinafter, referred to as "cooling medium outlet"), and the cooling medium arriving at the hole 70*b* through the inter-cell cooling medium passage 82 flows out from the hole 70*b*.

The state shown in FIG. 4A continues for the predetermined period. It is to be noted herein that the "predetermined period" is a period of time that it takes for the water pump 36 to discharge the amount of flow that is needed to replace the entire cooling medium present in the fuel cell stack 20 (hereinafter, the amount of flow will be referred to as "replacement flow amount VT"). Where the volumetric capacity of the inter-cell cooling medium passage 82 is represented by VC and the number of the cooling medium plates 80 (i.e., the number of the unit cells) is represented by N, the replacement flow amount VT can be approximated by an expression VC×N. Therefore, the accumulated amount of flow discharged by the water pump 36 after switching to the state shown in FIG. 4A is calculated, and then the water pump 36 is switched from the forward rotation to the reverse rotation when the accumulated flow amount reaches the replacement flow amount VT.

The replacement flow amount VT may be determined as VC×N+VP, instead of VC×N. In the expression VC×N+VP, VP represents the total volumetric capacity of the hole 70*a* (or the hole 70*b*) that is connected to the inter-cell cooling medium passages 82. This configuration employing the calculation expression VC×N+VP more accurately approximates the replacement flow amount VT than the configuration employing the calculation expression VC×N.

Figure 4B:
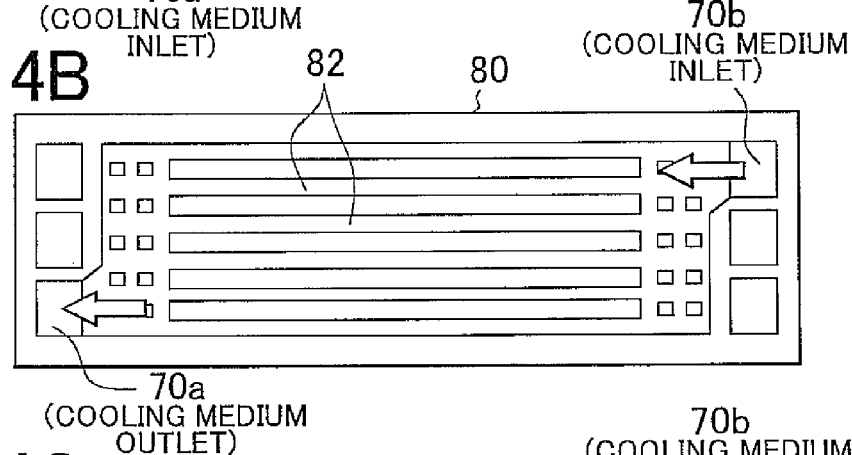

When the water pump 36 is operated in the reverse rotation, The cooling medium flows in the circulation circuit 32 in the reverse flow direction. At this time, in each cooling medium plate 80, the hole 70*b* functions as a cooling medium inlet as shown in FIG. 4B, and the cooling medium that flows in through the hole 70*b* moves from an upper right portion to a lower left portion of the inter-cell cooling medium passage 82 in the drawing. At this time, the hole 70*a* functions as a cooling medium outlet, and the cooling medium arriving at the hole 70*a* through the inter-cell cooling medium passage 82 flows out from the hole 70*a*. Specifically, in comparison with the state shown in FIG. 4A, the direction of flow of the cooling medium is revered in the state shown in FIG. 4B.

Figure 4C:
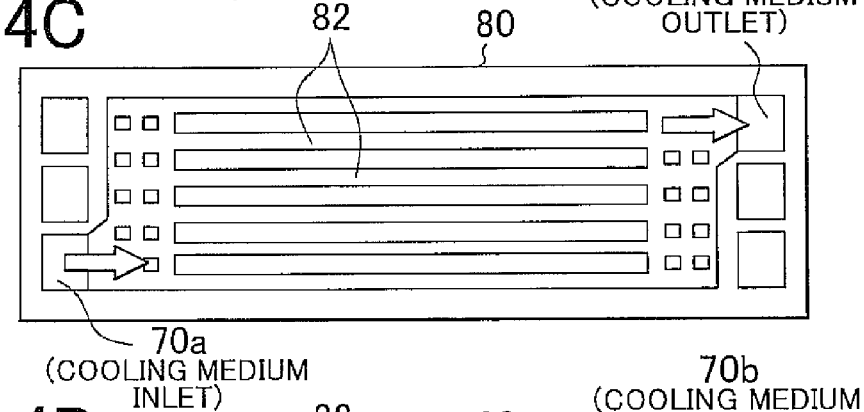
Figure 4D:
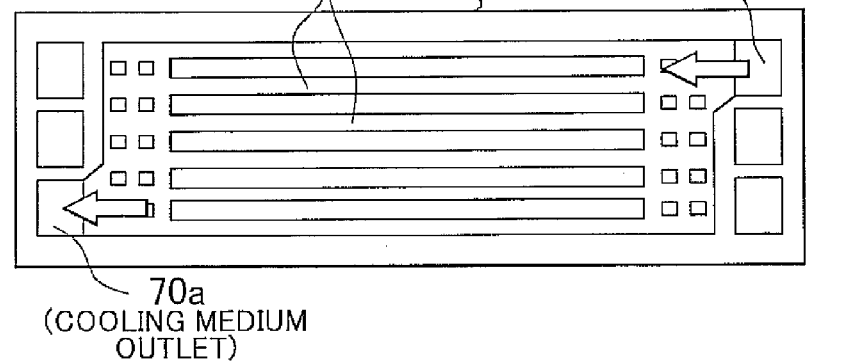

The state shown in FIG. 4B continues for the aforementioned predetermined period. As a result, the replacement flow amount VT of the cooling medium that flows out through the hole 70*b* during the state shown in FIG. 4A is returned into the inter-cell cooling medium passages 82 through the hole 70*b* in the state shown in FIG. 4B. After the state shown in FIG. 4B continues for the predetermined period, the water pump 36 is switched from the reverse rotation to the forward rotation to change the state of the flow of the cooling medium to the state shown in FIG. 4C. The flowing direction of the cooling medium in the state shown in FIG. 4C is the same as that in the state shown in FIG. 4A. After the state shown in FIG. 4C is continued for the predetermined period, the water pump 36 is switched from the forward rotation to the reverse rotation to change the state of the flow of the cooling medium to the state shown in FIG. 4D. The flowing direction of the cooling medium in the state shown in FIG. 4D is the same as that in the state show in FIG. 4B. After the state shown in FIG. 4D, the direction of flow of the cooling medium in the inter-cell cooling medium passages 82 along the surfaces of the unit cells is alternately reversed (i.e., switched) each time the aforementioned predetermined period elapses.

According to the related art, the cooling medium is caused to flow merely in one direction in the inter-cell cooling medium passages, so that a planar region of each inter-cell cooling medium passage (a planar region thereof along the adjacent unit cell) has a temperature gradient in which the temperature gradually increases in the direction of flow of the cooling medium. In contrast, in the first embodiment, since the direction of flow of the cooling medium is alternately reversed according to the elapsed time by operating the water pump 36 in the above-described forward/reverse rotation mode, the temperature can be made uniform. Furthermore, in this embodiment, since the period of switching is set at a length of time that it takes for the water pump 36 to discharge the amount of flow that is needed to replace the entire cooling medium present within the fuel cell stack 20, the replacement flow amount VT of the same cooling medium is repeatedly caused to flow into the fuel cell stack 20, so that the temperature of the cooling medium is increased, as compared to the related art.

In this embodiment, since each of the states shown in FIGS. 4A to 4D continues for the aforementioned predetermined period, the accumulated amounts of flow of the cooling medium pumped out in the four states are equal. However, as a modification for this embodiment, the configuration may be such that the period in which each state continues is fixed, and the amount of discharge from the water pump 36 may be increased so that the accumulated amounts of flow pumped in the four states are gradually increased. According to this configuration, the cooling effect can be gradually increased.

A3. Effects of the Embodiment

Figure 5:
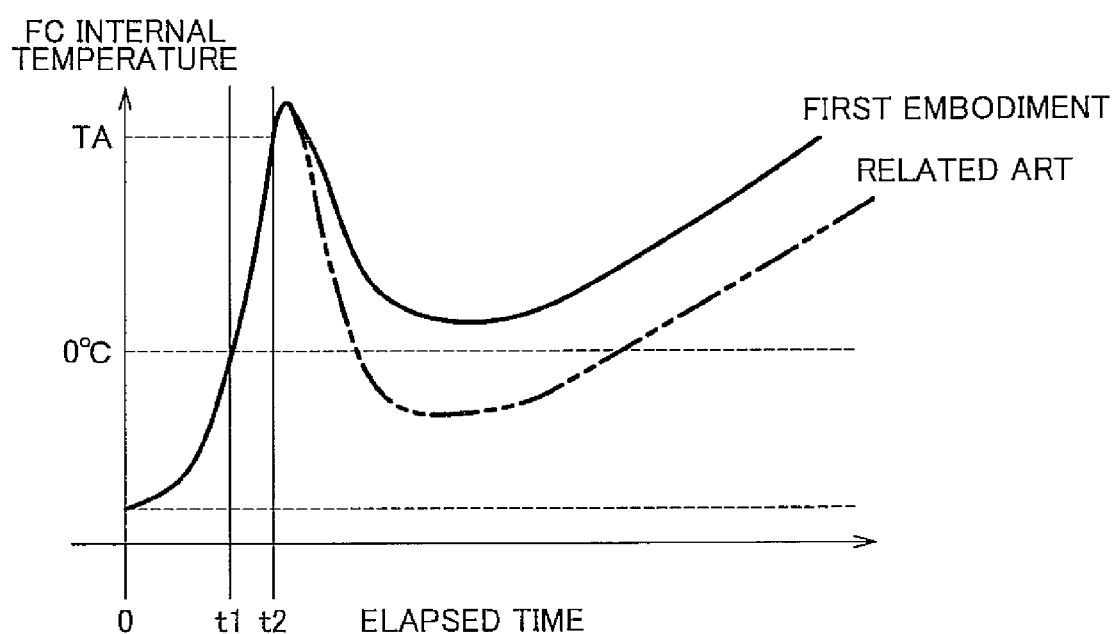
FIG. 5 is a graph showing effects achieved by the fuel cell system of the first embodiment in comparison with a related-art system.

FIG. 5 is a graph showing effects achieved by the fuel cell system 10 of the first embodiment in comparison with the effects achieved by the related art. In the graph, the horizontal axis shows the elapsed time after the turning-on of the start switch 46, and the vertical axis shows the internal temperature of the fuel cell system 10 (i.e., the internal temperature of the fuel cell stack 20) (hereinafter, referred to as "FC internal temperature"). In the graph, a solid line shows the FC internal temperature over time in the first embodiment, and a two-dot dashed line shows the FC internal temperature over time in the related art. As shown in FIG. 5, the FC internal temperature at the time when the start switch 46 is turned on is assumed to be lower than or equal to the freezing point. If the FC internal temperature is lower than or equal to the freezing point, the fuel cell stack 20 is activated by the process of S120 in the activation-time control routine. At this time, the water pump 36 is in a stopped state, and therefore the cooling medium does not circulate in the fuel cell system 10. In this state, the FC internal temperature gradually rises, and exceeds 0° C. at time t1, and, at time t2, exceeds the predetermined temperature TA that is used as a threshold value for the determination in step S140.

When the FC internal temperature exceeds the predetermined temperature TA, the temperature of the air off-gas also exceeds the predetermined temperature TA, so that the water pump 36 starts to be operated in the forward/reverse rotation mode. As the operation of the water pump 36 starts, the cooling medium flows into the fuel cell system 10, so that the FC internal temperature rapidly drops. In the related art, the FC internal temperature returns to a level below the freezing point, as shown by the two-dot dashed line in FIG. 5. Therefore, in the related art, if there is a large amount of remaining water in the fuel cell system before the system is activated, the remaining water sometimes re-freezes, and damages the catalyst layer. In contrast, in the first embodiment, since the water pump 36 is operated in the forward/reverse rotation mode, the temperature in the planar region of each inter-cell cooling medium passage 82 (a planar region along the adjacent cell) can be made uniform. Furthermore, since the temperature of the cooling medium is increased as compared to the related art, the decline of the FC internal temperature is lessened. Therefore, the FC internal temperature does not return to a level below the freezing point, as shown by the solid line in FIG. 5. Therefore, in the fuel cell system 10 of the first embodiment, it is possible to prevent damages to the catalyst layer caused by the re-freezing of remaining water after the system is activated.

B. Second Embodiment

A second embodiment of the invention will be described. A fuel cell system as the second embodiment of the invention differs from the fuel cell system 10 of the first embodiment in the shape of the cooling medium plates included in the fuel cell stack, and in the cooling system provided for passing the cooling medium through the cooling medium plates. The other hardware configurations are the same as in the first embodiment. In the following description, the same component parts as in the first embodiment are denoted by the same reference characters as in the first embodiment.

Figure 6:
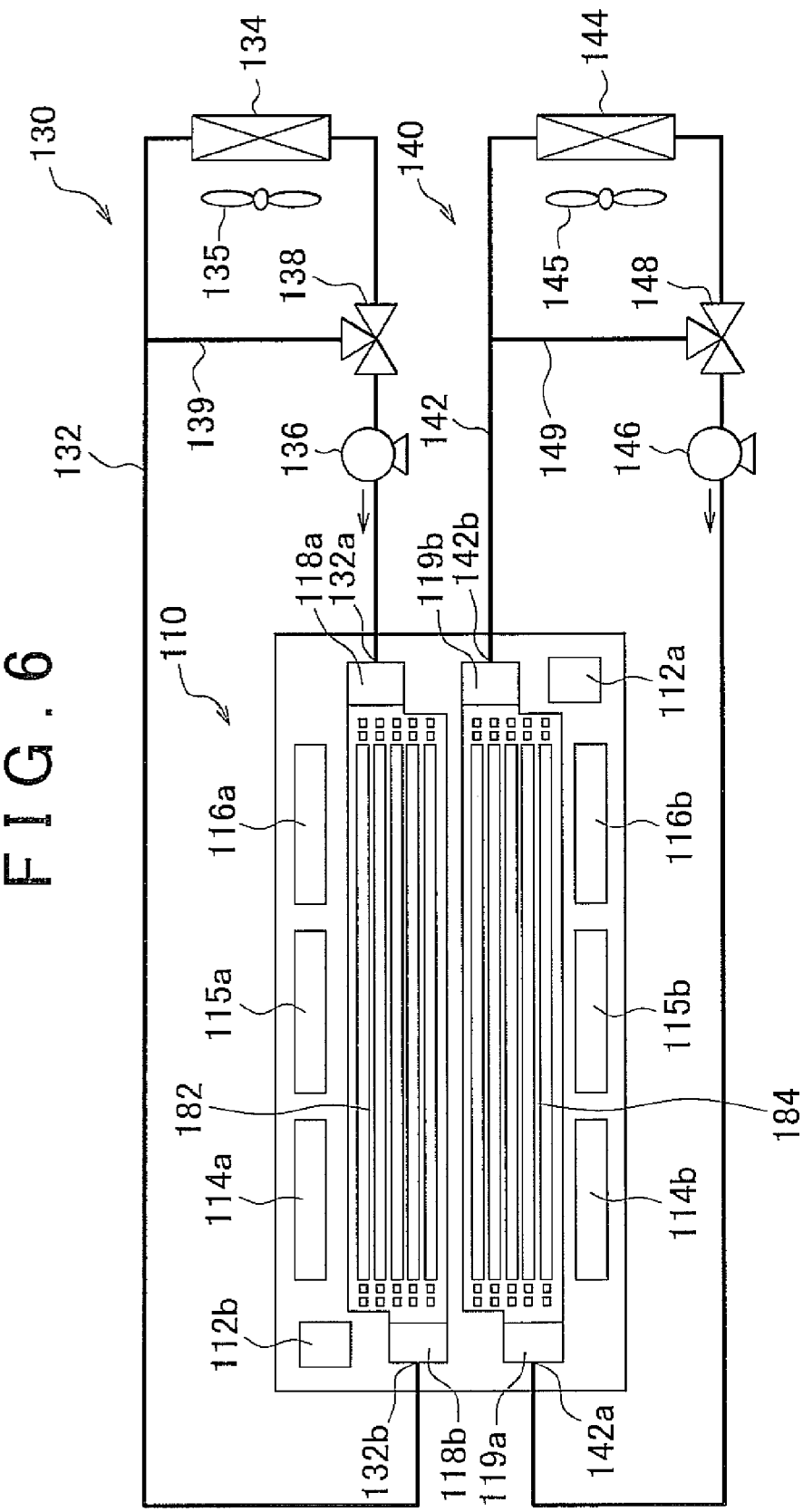
FIG. 6 is an illustrative diagram showing a cooling medium plate and two cooling systems 130 and 140 in a second embodiment of the invention.

FIG. 6 is an illustrative diagram showing a cooling medium plate 110, and two cooling systems 130 and 140 provided for passing a cooling medium through each cooling medium plate 110 in the second embodiment. In FIG. 6, the cooling medium plate 110 is shown in a plan view. As shown in FIG. 6, the cooling medium plate 110 has a plurality of holes (a plurality of through holes). The holes are formed so that when the cooling medium plates 110 are provided in a fuel cell stack, the holes extend through the unit cells of the fuel cell stack, and form passages through which a fuel gas, an oxidant gas and the cooling medium flow in the stacking direction in which the fuel cells are stacked. Specifically, a hole 112a of each cooling medium plate 110 forms an upstream-side passage for the fuel gas, and a hole 112b thereof forms a downstream-side passage for the fuel gas. Holes 114a, 115a and 116a form upstream-side passages for the oxidant gas, and holes 114b, 115b and 116b form downstream-side passages for the oxidant gas. Holes 118a and 119a form upstream-side passages for the cooling medium, and holes 118b and 119b form downstream-side passages for the cooling medium.

In a central region of each cooling medium plate 110, which faces an electricity generation region of the adjacent unit cell (i.e., faces it in the unit cell stacking direction), an inter-cell cooling medium passage made up of a plurality of groove passages is formed. The inter-cell cooling medium passage is actually divided into a first inter-cell cooling medium passage 182 and a second inter-cell cooling medium passage 184. One end of the first inter-cell cooling medium passage 182 is connected to the hole 118a that forms the upstream-side cooling medium passage, and another end of the first inter-cell cooling medium passage 182 (i.e., an end portion opposite to the end portion that is connected to the hole 118a) is connected to the hole 118b that forms the downstream-side cooling medium passage. One end of the second inter-cell cooling medium passage 184 is connected to the hole 119a that forms the upstream-side cooling medium passage, and another end of the second inter-cell cooling medium passage 184 (i.e., an end portion opposite to the end portion that is connected to the hole 119a) is connected to the hole 119b that forms the downstream-side cooling medium passage.

Similarly to the cooling system 30 in the first embodiment, the two cooling systems 130 and 140 include circulation circuits 132 and 142, respectively, which circulate the cooling medium. The circulation circuits 132 and 142 are provided with radiators 134 and 144, water pumps 136 and 146, three-way valves 138 and 148 and bypass passages 139 and 149. Near the radiators 134 and 144, there are disposed electric fans 135 and 145. The cooling systems 130 and 140 operate in the same manner as the manner in which the cooling system 30 of the first embodiment operates.

A supply opening 132a of the first circulation circuit 132 is connected to one of the two holes that form the upstream-side cooling medium passages, that is, the hole 118a. A reception opening 132b of the first circulation circuit 132 is connected to one of the two holes that form the downstream-side cooling medium passages, that is, the hole 118b. A supply opening 142a of the second circulation circuit 142 is connected to the other one of the two holes that form the upstream-side cooling medium passages, that is, the hole 119a. A reception opening 142b of the second circulation circuit 142 is connected to the other one of the two holes that form the downstream-side cooling medium passages, that is, the hole 119b. As a result, in the first inter-cell cooling medium passage 182 shown at an upper side in FIG. 6, the cooling medium flows from the right side to the left side in the drawing, and in the second inter-cell cooling medium passage 184 shown at a lower side in FIG. 6, the cooling medium flows from the left side to the right side in the drawing. Specifically, the direction of flow of the cooling medium in the first inter-cell cooling medium passage 182 and the direction of flow of the cooling medium in the second inter-cell cooling medium passage 184 are opposite to each other. In other words, the inter-cell cooling medium passage in the entire cooling medium plate 110 includes the first and second inter-cell cooling medium passages 182 and 184 whose directions of flow of the cooling medium are opposite to each other.

The fuel cell system in the second embodiment differs from the fuel cell system 10 of the first embodiment in terms of software only in the following respects. The CPU 51 executes an activation-time control routine that is similar to the activation-time control routine (FIG. 3) executed in the first embodiment, and a difference of the activation-time control routine of the second embodiment from that of the first embodiment is the process of step S150.

In step S150 in the routine of the first embodiment, the water pump 36 is operated in the forward/reverse rotation mode, in order to reverse the direction of flow of the cooling medium in the inter-cell cooling medium passage 82 within the fuel cell stack 20 at intervals of the predetermined period. In the second embodiment, on the other hand, the first water pump 136 and the second water pump 146 are controlled as described below in order that the direction of flow of the cooling medium in the inter-cell cooling medium passage (i.e., the inter-cell cooling medium passage that includes the first and second inter-cell cooling medium passages 182 and 184) within the fuel cell stack 20 is reversed at intervals of a predetermined period.

Figure 7A:
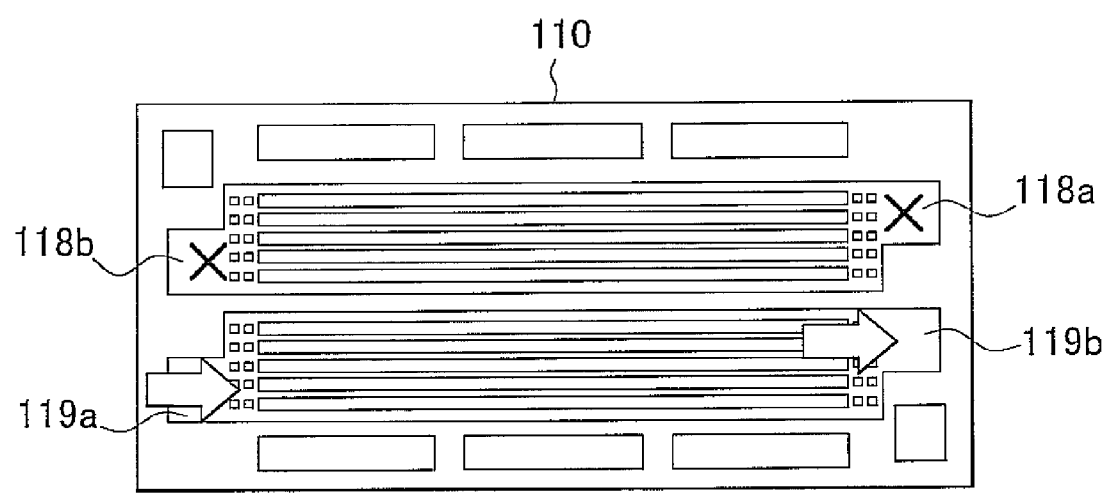
FIGS. 7A and 7B is an illustrative diagram showing changes of the direction of flow in an inter-cell cooling medium passage in the second embodiment.
Figure 7B:
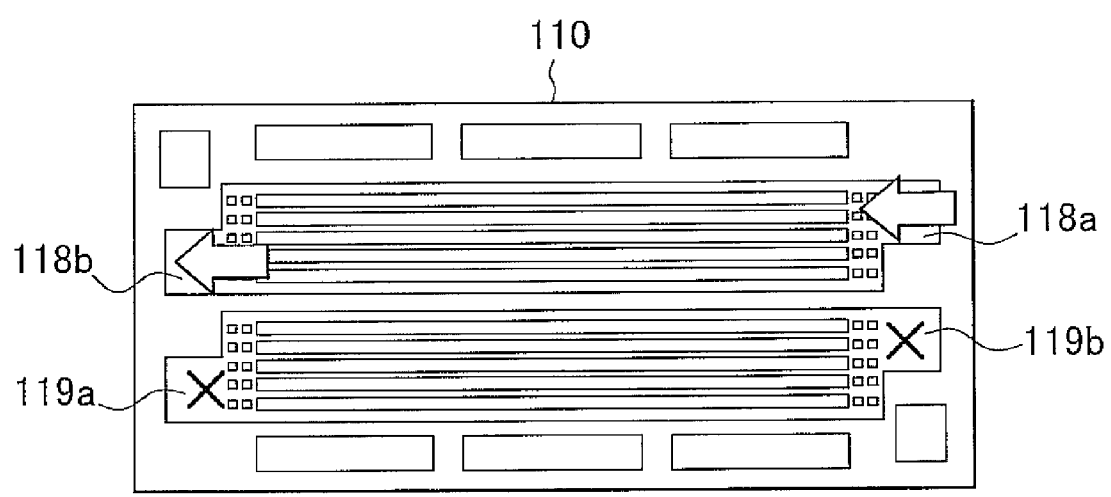

FIGS. 7A and 7B are illustrative diagrams showing changes of the direction of flow in the inter-cell cooling medium passage in the second embodiment. FIGS. 7A and 7B are plan views of the cooling medium plate 110. The state of the first inter-cell cooling medium passage 182 and the second inter-cell cooling medium passage 184 as the inter-cell cooling medium passage formed on the cooling medium plate 110 is switched from the state shown in FIG. 7A to the state shown in FIG. 7B each time the predetermined period elapses.

In the beginning, the first water pump 136 is stopped and the second water pump 146 is operated. The operation of the water pump in the second embodiment is always the operation in the forward rotation. As a result, as shown in FIG. 7A, the flow of the cooling medium stops in the first inter-cell cooling medium passage 182 located at an upper side in the cooling medium plate 110 in the drawing, and the cooling medium flows from left to right in the drawing in the second inter-cell cooling medium passage 184 located at a lower side in the drawing. This state continues for the predetermined period. The predetermined period mentioned herein is a period that it takes the water pump 146 to discharge the amount of flow of the cooling medium that is needed to replace the entire cooling medium present in all the second inter-cell cooling medium passages 184 included in the fuel cell stack 20.

After the predetermined period elapses, the state is switched to the state shown in FIG. 7B. In this state, the first water pump 136 is operated, and the second water pump 146 is stopped. As shown in FIG. 7B, the cooling medium flows from right to left in the drawing in the first inter-cell cooling medium passage 182 located at the upper side in the cooling medium plate 110 in the drawing, and the cooling medium stops flowing in the second inter-cell cooling medium passage 184 located at the lower side in the drawing. As a result, in the inter-cell cooling medium passage including the first inter-cell cooling medium passage 182 and the second inter-cell cooling medium passage 184, the direction of flow of the cooling medium in the state shown in FIG. 7A and the direction of flow of the cooling medium in the state shown in FIG. 7B are opposite to each other.

The state shown in FIG. 7B continues for the aforementioned predetermined period. After that, the state is switched to the state shown in FIG. 7A. Thus, after the state shown in FIG. 7B, too, the direction of flow of the cooling medium in the inter-cell cooling medium passage along the surface of the adjacent unit cell is alternately reversed or switched in intervals of the predetermined period.

In step S170 in the activation-time control routine (FIG. 3) in this embodiment, both the first water pump 136 and the second water pump 146 start to be operated.

In the fuel cell system of the second embodiment configured as described above, it is possible to prevent damages to the catalyst layer caused by the re-freezing of remaining water when the water pumps 136 and 146 are started at a low temperature, as in the first embodiment.

C. Third Embodiment

A third embodiment of the invention will be described below. A fuel cell system as the third embodiment has the same hardware configuration as the fuel cell system 10 of the first embodiment, and differs from the fuel cell system 10 of the first embodiment only in the activation-time control routine that the CPU 51 executes. The same component parts as in the first embodiment are denoted by the same reference characters as in the first embodiment, in the following description.

Figure 8:
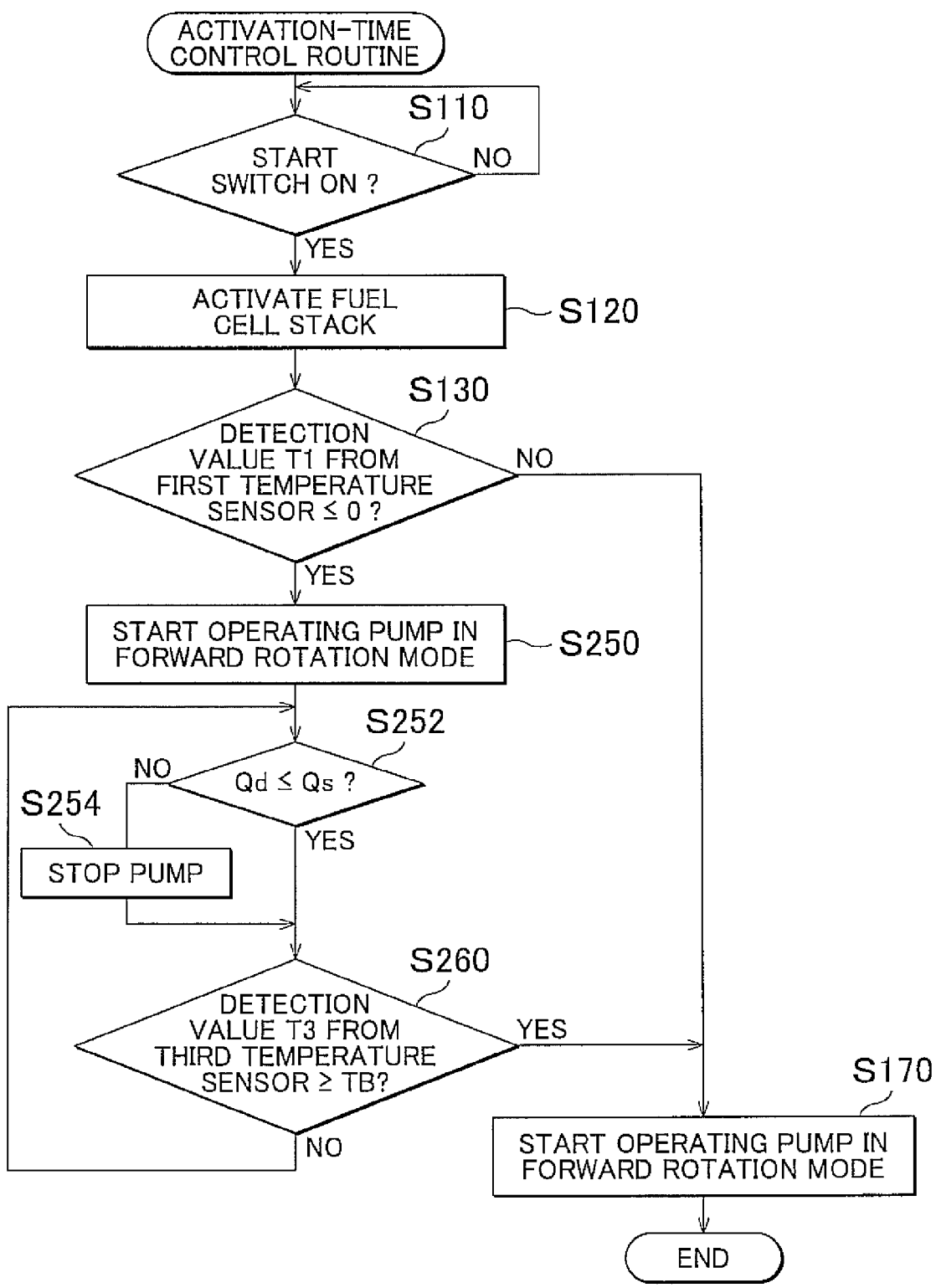
FIG. 8 is a flowchart showing an activation-time control routine in a third embodiment of the invention.

FIG. 8 is a flowchart showing the activation-time control routine in the third embodiment. This activation-time control routine is the same as the activation-time control routine (FIG. 3) in the first embodiment, with respect to steps S110, S120, S130 and S170. If in step S130, it is determined that the detection value T1 from the first temperature sensor 41 is lower than or equal to 0° C., the CPU 51 proceeds to step S250.

In step S250, the CPU 51 starts operating the water pump 36 in the forward rotation mode. After the operation of the water pump 36 starts and the cooling medium starts circulating, the CPU 51 then determines whether or not an accumulated absorbed heat quantity Qd is less than or equal to a criterion heat quantity Qs (step S252).

The accumulated absorbed heat quantity Qd is a total quantity of heat absorbed by the cooling medium after the start of the circulation of the cooling medium in the cooling system 30, and is determined as follows. Firstly, the absorbed heat quantity Q1 (kJ) per unit time is as in the following expression (1).

$$Q1 = (Tc - Tw) \cdot C \cdot A \cdot B \tag{1}$$

where:
Tc is the internal temperature (K) of the fuel cell stack 20;
Tw is the temperature (K) of the cooling medium flowing into the fuel cell stack 20;
A is the specific heat (kJ/(kg·K)) of the cooling medium;

B is the amount of flow (m³/s) of the cooling medium flowing into the fuel cell stack 20; and C is the density (kg/m³) of the cooling medium flowing into the fuel cell stack 20.

As the value of Tc, a detection value from the third temperature sensor 44 may be used. As the value of Tw, it is possible to use a detection value from the first temperature sensor 41 during the forward rotation of the water pump 36 and a detection value from the second temperature sensor 42 during the reverse rotation of the water pump 36. As the values of A, B and C, it is possible to use values that are preliminarily measured or predetermined values (constants). The value of A is determined based on the composition of the cooling medium, the value of B is determined based on the amount of delivery from the pump, and the value of C is determined based on a function of the composition and the temperature, Hence, the accumulated absorbed heat quantity Qd (kJ) can be determined using the following expression (2).

$$Qd = \Sigma Q1 = A \cdot B \cdot C \cdot \Sigma (Tc - Tw) \quad (2)$$

Since the accumulated absorbed heat quantity Qd serves to lower the internal temperature of the fuel cell stack 20, when the accumulated absorbed heat quantity Qd is excessively large, the cooling medium may freeze in a unit cell, particularly, near the inlet portion for the cooling medium. The criterion heat quantity Qs is a threshold value at which the cooling medium freezes, and is determined as follows.

The criterion heat quantity Qs is a sum of an absorbed heat quantity Q2 that is needed for the temperature of the fuel cell stack 20 to decline to the freezing point and an accumulated generated heat quantity Q3 that is an accumulated quantity of heat generated by the fuel cell stack 20 after the start of the circulation of the cooling medium in the cooling system 30. The absorbed heat quantity Q2 (kJ) is determined using the following expression (3).

$$Q2 = (Tst - 0) \cdot D \quad (3)$$

where:

Tst is the internal temperature (K) of the fuel cell stack 20 at the time of start of the circulation of the cooling medium; and D is the heat capacity (kJ/K) of the fuel cell stack 20.

A method of determining the accumulated generated heat quantity Q3 is as follows. The chemical energy of hydrogen is 241.82 kJ/mol (on an LHV basis). A conversion efficiency η of the unit cell is determined by the cell voltage E (V), and is given as in the following expression (4) using a Faraday constant F (As/mol) and the mechanical equivalent of heat (joule/cell).

$$\eta = (2F/J) \cdot E \cdot (1/\Delta HH_2) = 0.798 \cdot E \quad (4)$$

where ΔH is the energy of the fuel.

Hence, the generated heat quantity Q for 1 mol of hydrogen is determined using the following expression (5).

$$Q(kJ/mol) = (1 - \eta) \times 241.82 = (1 - 0.798 \times E) \times 241.82 \quad (5)$$

The amount of reaction of hydrogen HV (mol/s) in the unit cell can be calculated if the electric current I (A) is measured, that is, can be determined using the following expression (6).

$$HV = I/96485/2 \quad (6)$$

A generated heat quantity Qstk (kJ), which is a quantity of heat generated by the fuel cell stack 20, is a sum of the quantities of heat generated by the individual unit cells, and is determined using the following expression (7).

$$Q7 = \Sigma [\{(1 - 0.798 \times Vi) \times 241.82\} \times Ii/(96485/2)] \quad (7)$$

Hence, the accumulated generated heat quantity Q3 (kJ), which is the accumulated quantity of heat generated by the fuel cell stack 20 after the start of the circulation of the cooling medium in the cooling system 30, is determined using the following expression (8).

$$Q3 = \Sigma Q7 \quad (8)$$

In step S252 in FIG. 8, the CPU 51 determines the accumulated absorbed heat quantity Qd using the aforementioned expression (2), and determines the criterion heat quantity Qs by summing the absorbed heat quantity Q2 determined using the aforementioned expression (3) and the accumulated generated heat quantity Q3 determined using the expression (8), and then determines whether or not the accumulated absorbed heat quantity Qd is less than or equal to the criterion heat quantity Qs. If in this step, it is determined that the accumulated absorbed heat quantity Qd is less than or equal to the criterion heat quantity Qs, there is no possibility of the cooling medium freezing in the fuel cell stack 20, and the CPU 51 proceeds to step S260.

On the other hand, if in step S252, it is determined that the accumulated absorbed heat quantity Qd is greater than the criterion heat quantity Qs, there is a possibility of the cooling medium freezing in the fuel cell stack 20, and the CPU 51 proceeds to step S254, in which the CPU 51 stops operating the water pump 36. After the water pump 36 is stopped, or if an affirmative determination is made in step S252, the CPU 51 determines whether or not the detection value T3 from the third temperature sensor 44 is higher than or equal to a predetermined temperature TB (step S260). If the detection value T3 from the third temperature sensor 44, that is, the temperature of the air off-gas, is below the predetermined temperature TB, the CPU 51 returns to step S252. On the other hand, if the temperature of the air off-gas is a high temperature equal to or higher than the predetermined temperature TB, the CPU 51 proceeds to step S170.

In the fuel cell system of the third embodiment configured as described above, in the case where the fuel cells have been activated at a cold temperature, if the accumulated absorbed heat quantity Qd, which is the accumulated quantity of heat absorbed by the cooling medium after the start of the circulation of the cooling medium, is greater than the criterion heat quantity Qs, the operation of the water pump 36 is stopped and therefore the quantity of heat absorbed by the cooling medium is reduced, so that the re-freezing of the remaining water is further suppressed. Therefore, in the case where the fuel cells have been activated at a cold temperature, the damages to the catalyst layer caused by the re-freezing of remaining water can be more effectively prevented.

A modification of the first embodiment or the second embodiment may be provided by adding the process from step S252 to step S260, which is a feature of the third embodiment, to the activation-time control routine in the first embodiment or the second embodiment.

Furthermore, in an embodiment other than the first to third embodiments, in the case where the fuel cells have been activated at a cold temperature, the amount of circulation of the cooling medium in the cell-side passage for the cooling medium (i.e., the cell-side cooling medium passage) may be controlled so that the quantity of heat absorbed by the cooling medium is less than the quantity of heat generated by the fuel cells. In a broad view, inside the fuel cell, the temperature rises if the generated heat quantity is greater than the released heat quantity (the generated heat quantity>the released heat quantity), and the temperature declines if the generated heat quantity is smaller than the released heat quantity (the generated heat quantity<the released heat quantity). By performing a control such that the quantity of heat absorbed by the cooling medium (i.e., the quantity of heat released from the fuel cells) is less than the quantity of heat generated by the fuel cells, in order to maintain the temperature of the cooling medium at the time of re-start of the circulation, the re-freezing of the cooling medium is prevented.

D. Modifications

The invention is not limited to the foregoing embodiments or modifications, and may be carried out in various manners without departing from the gist of the invention. For example, the following modifications may be made.

MODIFICATION 1: Although in the foregoing embodiments and modifications, the inter-cell cooling medium passages 82, 182 and 184 as the cell-side cooling medium passage are formed by groove passages that extend in a planar direction of the fuel cells, the cell-side cooling medium passage does not need to be limited to the passage formed by groove passages, but may also have other shapes. For example, the inter-cell cooling medium passage as the cell-side cooling medium passage may be formed by a plurality of rectangular rib pieces.

MODIFICATION 2: In the first and second embodiments and their modifications, the water pump is stopped for a period from the time point at which the fuel cell stack 20 is activated at a low temperature up to the time point at which the detection value T3 from the third temperature sensor 44 exceeds the predetermined temperature TA (which corresponds to a "first predetermined period" in the invention). However, the terminal end of this period does not need to be limited to the time point at which the detection value T3 from the third temperature sensor 44 exceeds the predetermined temperature TA, and may also be, for example, a time point at which the elapsed time after the fuel cell stack 20 is activated at a low temperature exceeds a predetermined time. Besides, although in the first and second embodiments and their modifications, the operation of the water pump is controlled during the period from when the water pump starts to be operated to when the detection value T1 from the first temperature sensor 41 exceeds 0° C. in such a control manner that the direction of flow of the cooling medium in the cell-side cooling medium passage is alternately reversed according to the elapsed time, the terminal end of this period does not need to be the time point at which the detection value T1 from the first temperature sensor 41 exceeds 0° C., and may also be, for example, a time point at which the elapsed time after the start of operation of the water pump exceeds a predetermined time.

MODIFICATION 3: Besides, the invention may also be applied to a kind of fuel cell that is different from the fuel cells described above in the foregoing embodiments and modifications. For example, the invention may be applied to a direct methanol fuel cell. Alternatively, the invention may also be applied to a fuel cell that has an electrolyte layer other than the layer of a solid polymer. By applying the invention, it is possible to achieve substantially the same effects as those described above.

The invention is not limited at all by the foregoing embodiments or modifications, and may be carried out in various manners without departing from the gist of the invention.

What is claimed is:

1. A fuel cell system that includes a fuel cell, and a cell-side passage for a cooling medium, the cell-side passage having a first cell-side passage and a second cell-side passage that are disposed on a surface of the fuel cell, the fuel cell system comprising:
    a fuel cell activation portion that starts electricity generation of the fuel cell;
    a first cooling medium passage in which a first pump is disposed, the first cooling medium passage being provided for passing the cooling medium through the first cell-side passage;
    a second cooling medium passage in which a second pump is disposed, the second cooling medium passage being provided for passing the cooling medium through the second cell-side passage; and
    a pump control portion programmed to stop the first pump and the second pump for a predetermined period, after a start of the electricity generation caused by the fuel cell activation portion, at a time when a temperature of the fuel cell is lower than or equal to a predetermined value,
    wherein the pump control portion is programmed to, after the predetermined period elapses, alternately switch, according to an elapsed time, a direction of a flow of the cooling medium in the first cell-side passage and the second cell-side passage between a first state and a second state by controlling operation of the first pump and the second pump;
    wherein in the first state the flow of the cooling medium in the first cooling medium passage is stopped and the cooling medium in the second cooling medium passage is caused to flow in a first direction along the surface of the fuel cell, and in the second state the cooling medium in the first cooling medium passage is caused to flow in a second direction that opposes the first direction and the flow of the cooling medium in the second cooling medium passage is stopped.

2. The fuel cell system according to claim 1, wherein:
    the pump control portion is programmed to reverse the direction during a second predetermined period; and
    the pump control portion is programmed to continue operating at least one of the first pump and the second pump while setting the direction of the flow of the cooling medium in the cell-side passage to one direction by controlling the operation of at least one of the first pump and the second pump, after the second predetermined period elapses.

3. The fuel cell system according to claim 1, wherein the predetermined period is a period that elapses until an internal temperature of the fuel cell exceeds a predetermined value.

4. A control method for a fuel cell system that includes a fuel cell, a cell-side passage for a cooling medium, the cell-side passage having a first cell-side passage and a second cell-side passage that are disposed along a surface of the fuel cell, a first cooling medium passage in which a first pump is disposed, the first cooling medium passage being provided for passing the cooling medium through the first cell-side passage, a second cooling medium passage in which a second pump is disposed, the second cooling medium passage being provided for passing the cooling medium through the second cell-side passage, wherein
    electricity generation of the fuel cell is started based on a start request from an operator;
    the first pump and the second pump are stopped for a predetermined period after a start of the electricity generation at a time when a temperature of the fuel cell is lower than or equal to a predetermined value;
    alternatively switching a direction of a flow of the cooling medium in the first cell-side passage and the second cell-side passage between a first state and a second state, according to an elapsed time, by a pump control portion programmed to control the operation of the first pump and the second pump, after the predetermined period elapses, in the first state the flow of the cooling medium in the first cooling medium passage is stopped and the cooling medium in the second cooling medium passage is caused to flow in a first direction along the surface of the fuel cell, and in the second state the cooling medium in the first cooling medium passage is caused to flow in a second direction that opposes the first direction and the flow of the cooling medium in the second cooling medium passage is stopped.

* * * * *